(12) United States Patent
Sato et al.

(10) Patent No.: US 6,574,011 B1
(45) Date of Patent: Jun. 3, 2003

(54) IMAGE FORMATION APPARATUS

(75) Inventors: Chikara Sato, Hachioji (JP); Norifumi Miyake, Kashiwa (JP); Yasuo Fukazu, Abiko (JP); Masatoshi Yaginuma, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/179,576

(22) Filed: Oct. 27, 1998

(30) Foreign Application Priority Data

Oct. 27, 1997 (JP) .............................. 9-311400

(51) Int. Cl.⁷ ................................................ H04N 1/00
(52) U.S. Cl. ........................................ 358/401; 358/488
(58) Field of Search ................................ 358/488, 474, 358/509, 513, 401, 475

(56) References Cited

U.S. PATENT DOCUMENTS

| | | | | |
|---|---|---|---|---|
| 5,724,641 A | * | 3/1998 | Shojo | 399/410 |
| 5,745,253 A | * | 4/1998 | Muramasu | 358/474 |
| 5,794,099 A | * | 8/1998 | Sheldon et al. | |
| 5,908,188 A | * | 6/1999 | Katamoto | 271/3.08 |
| 5,953,134 A | * | 9/1999 | Sato | 358/488 |

FOREIGN PATENT DOCUMENTS

| | | | | |
|---|---|---|---|---|
| JP | 5-35151 | 2/1993 | .......... | G03G/15/22 |
| JP | 6-247641 | 6/1994 | .......... | B65H/85/00 |
| JP | 7-245696 | 9/1995 | .......... | H04N/1/387 |
| JP | 8-82963 | 3/1996 | .......... | G03G/15/00 |
| JP | 8-133564 | 5/1996 | .......... | B65H/37/04 |

* cited by examiner

*Primary Examiner*—Jerome Grant, II
*Assistant Examiner*—Negussie Worku
(74) *Attorney, Agent, or Firm*—Fitzpatrick, Cella, Harper & Scinto

(57) ABSTRACT

A image formation apparatus to which a postprocess unit requiring a discharge condition that a transfer member of which image formation face is being turned downward is discharged and a binding position at a time of binding the member at its trailing edge is being at the left of the image formation face can be installed. On a platen glass, an original is carried in such a state as its read face is opposite to an upper face of the glass, and an image on the read face of the original is read by a scanner supported at a running read position when the original passes the running read position. Then, through a mirror image process, it is formed on an image formation face (upper face) of a sheet the read image of which direction is the same as that of the set original. When the image-formed sheet is discharged externally by the reverse sheet discharge control, the sheet is discharged in such a state as its face is being turned downward.

25 Claims, 14 Drawing Sheets

ORIGINAL

ORIGINAL

RECORDING PAPER

RECORDING PAPER

RECORDING PAPER

RECORDING PAPER

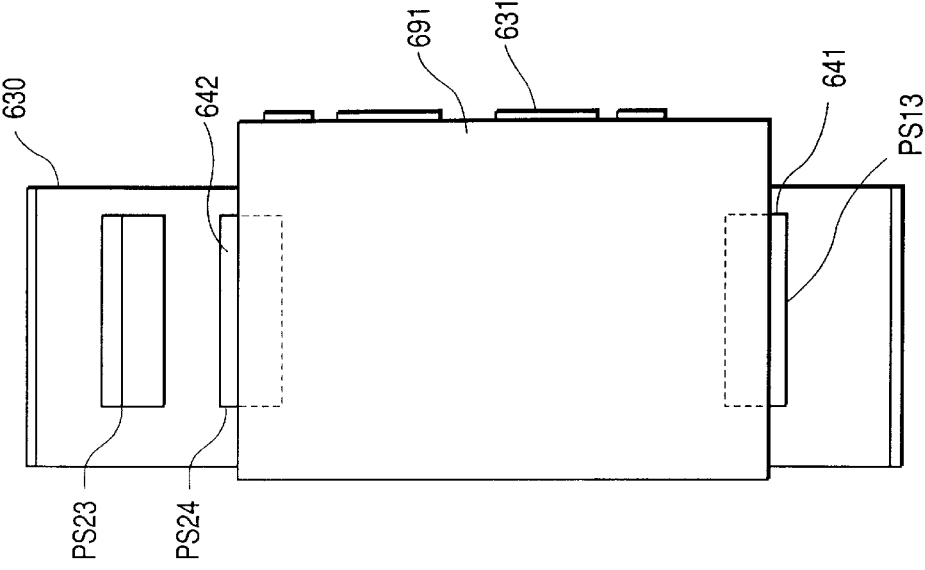
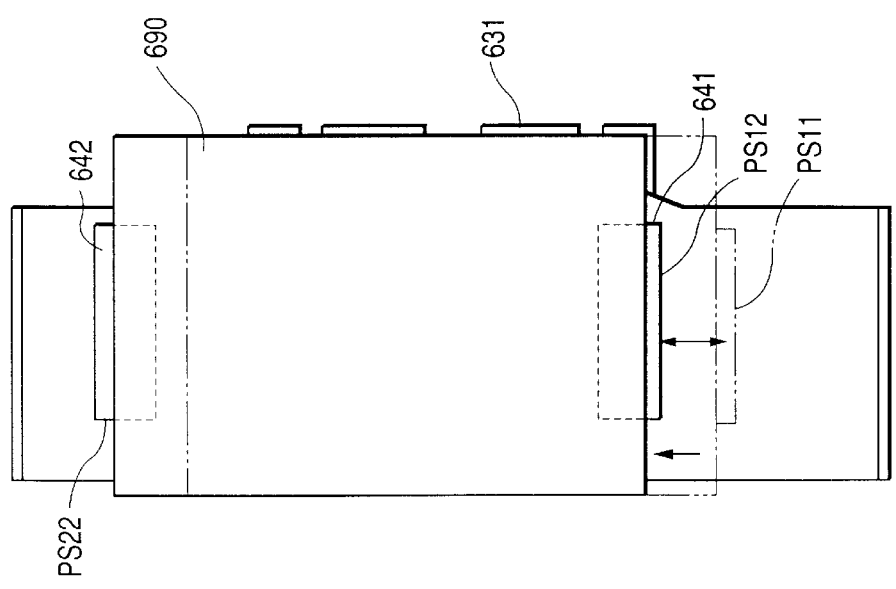

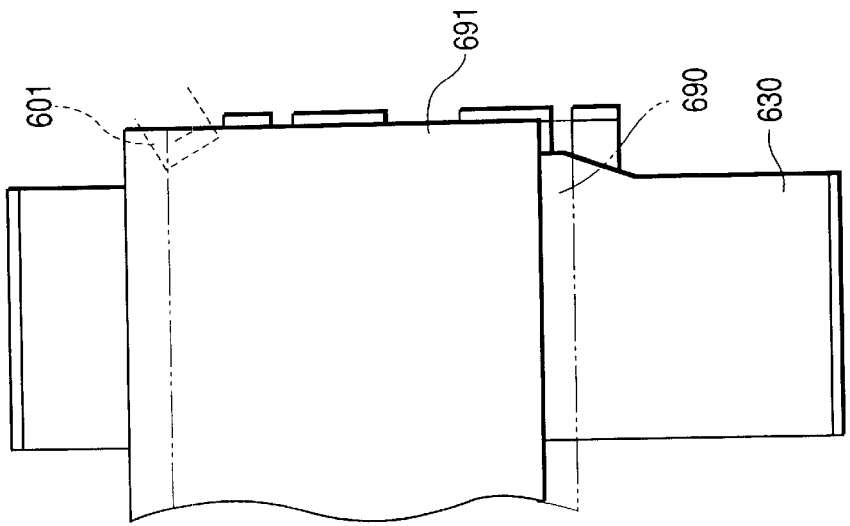
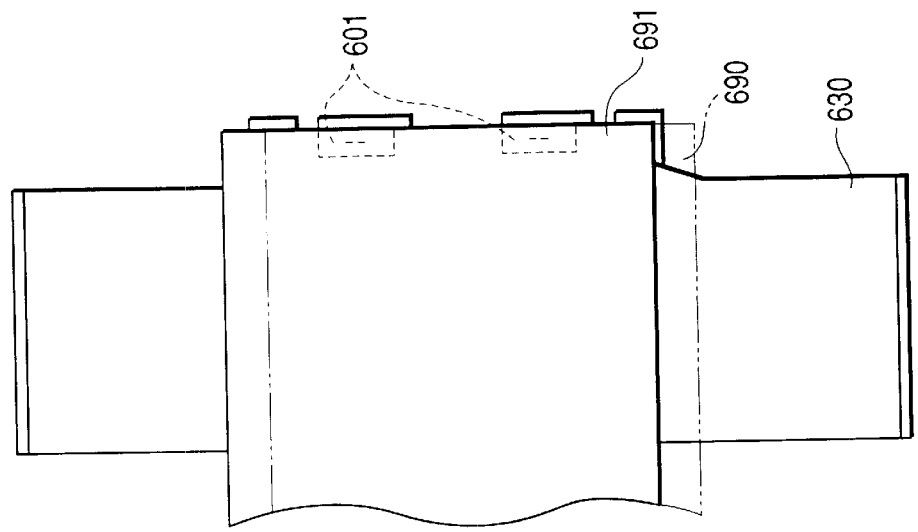

IMAGE FORMATION APPARATUS

BACKGROUND OF THE INVENTION

1. Field of the Invention

The present invention relates to an image formation apparatus which sequentially reads an original from its initial page and then forms a read image on a transfer member (e.g., sheet of paper).

2. Related Background Art

As a conventional image formation apparatus which reads an image of an original put on an original mounting board and then forms the read image on a transfer member, there is provided the apparatus to which an original carrier means for sequentially and automatically carrying the original in such a state as its face from which the image is read (referred as read face hereinafter) is opposite to the original mounting board is installed, to reduce user's inconvenience in an original handling operation. To improve convenience in use of the image formation apparatus, there is provided the apparatus to which the original carrier means for carrying the original from its initial page onto the original mounting board is installed. Further, to improve copy productivity, the image formation apparatus which performs a running read operation is also realized. In the running read operation, the original is carried in a sub-scan direction by the original carrier means while it is passed through a running read position defined on the board, and the image on the read face of the original is read by scanning the read face in a main-scan direction at the time when the original carried by the original carrier means passes the running read position.

Also, a process system which automatically executes a postprocess on a transfer member can be seen. That is, in this system, a postprocess unit for executing the postprocess such as a binding process, a sort process or the like on the transfer members discharged from the image formation apparatus is installed to the image formation apparatus.

As the process executed by such a postprocess unit, there is the above-described binding process, the sort process or the like. In this case, a capability or condition of the process is determined according to a processing capability of the image formation apparatus connected to the postprocess unit and a discharge condition of the transfer member.

However, a postprocess unit having more satisfactory performance cannot be proposed without considering specifications of the already-available image formation apparatus. That is, a new postprocess unit has to be proposed always on the premise that the image formation apparatus to which the postprocess unit is installed is limited to some extent. On the contrary, a new image formation apparatus is sometimes proposed to be able to correspond to the postprocess unit newly proposed.

The inventors have proposed the postprocess unit which sequentially takes in the transfer member discharged from the image formation apparatus in the state that its discharge condition is maintained, stacks these members took in, and then executes the binding process to bind a sheaf of the stacked members at its trailing edge defined based on the discharge condition. In this connection, the image formation apparatus to be jointed to this postprocess unit is required to discharge the transfer member of which image formation face is being turned downward and of which trailing-edge binding position is being at the left of the image formation face.

However, in the above image formation apparatus, such a required paper discharge condition can not be obtained without spoiling the convenience in use and the copy productivity.

SUMMARY OF THE INVENTION

An object of the present invention is to provide an image formation apparatus which can solve the above-described problem.

Another object of the present invention is to provide the image formation apparatus to which a postprocess unit requiring a discharge condition that a transfer member of which image formation face is being turned downward is discharged and a binding position at a time of binding the member at its trailing edge is being at the left of the image formation face is installed.

Other objects and features of the present invention will become apparent from the following description and the accompanying drawings.

BRIEF DESCRIPTION OF THE DRAWINGS

FIG. 19 is a view for explaining the adjustment operation on the process tray 630 in the finisher shown in FIG. 2;

FIG. 20 is a view for explaining the adjustment operation on the process tray 630 in the finisher shown in FIG. 2;

FIG. 21 is a view for explaining an operating state according to a binding mode (front-oblique binding mode, rear-oblique binding mode, or two-point binding mode) of a stapler 601;

FIG. 22 is a view for explaining the operating state according to the binding mode (front-oblique binding mode, rear-oblique binding mode, or two-point binding mode) of the stapler 601.

DETAILED DESCRIPTION OF PREFERRED EMBODIMENT

Hereinafter, the embodiment of the present invention will be explained with reference to the accompanying drawings.

Figure 1:
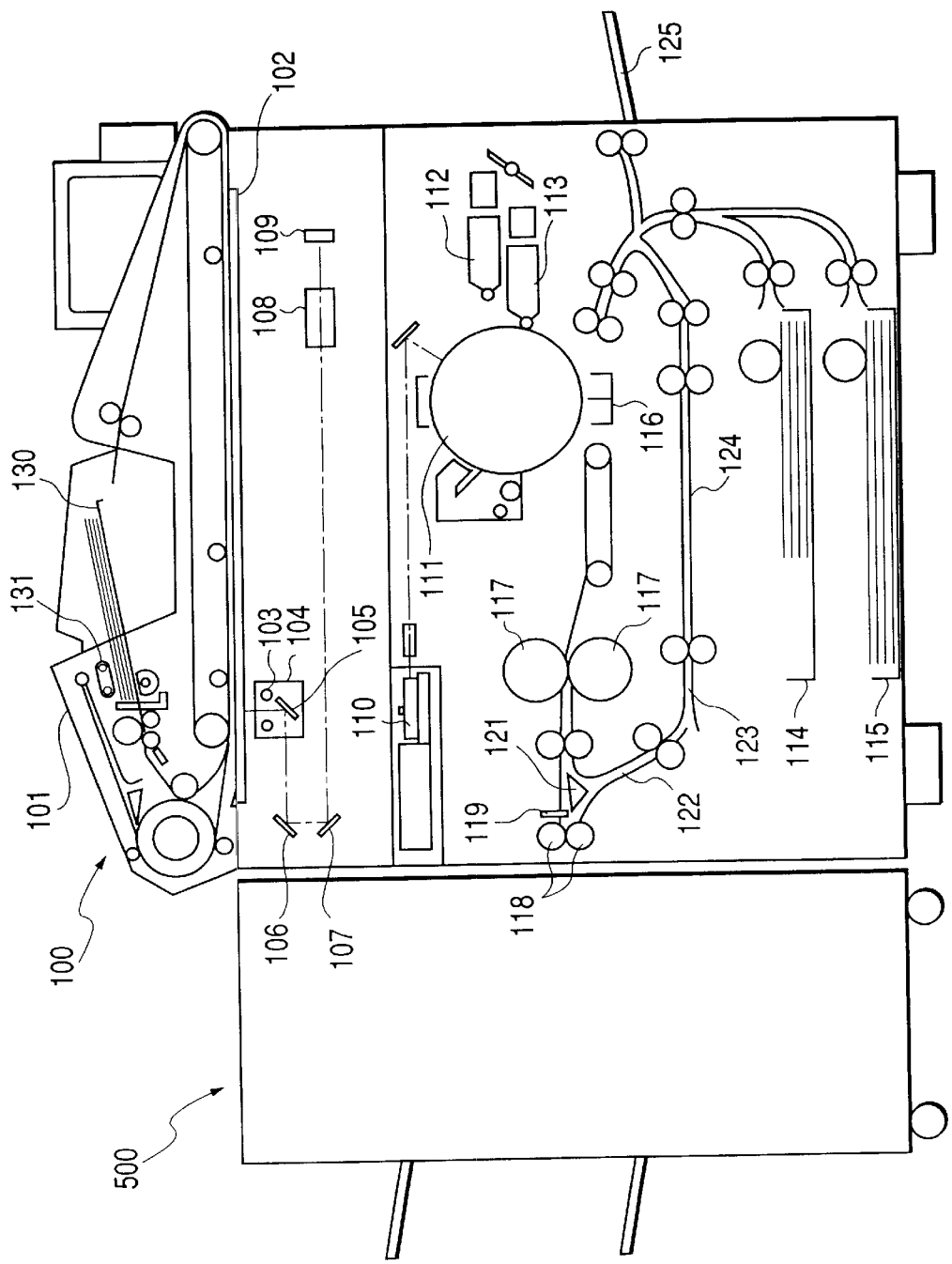
FIG. 1 is a sectional view showing a structure of an image forming apparatus according to an embodiment of the present invention.

FIG. 1 is a sectional view showing a structure of an image formation apparatus according to the present invention.

As shown in FIG. 1, an image formation apparatus 100 mounts thereon an automatic original feed unit 101. The unit 101 feeds leftward an original set upward on an original tray 130 from its initial page one by one in due order by a pickup roller 131, carries the fed original from left to right above a previously set running read position on a platen glass 102 through a curved path, and then carries the original outward. At a time when the original carried from left to right passes through the running read position on the glass 102, an image on this original is read by a scanner unit 104 supported at a position corresponding to the running read position. Concretely, when the original passes through the running read position, a face of the original to be read (referred as read face hereinafter) is illuminated by light from a lamp 103 of the scanner unit 104, and reflected light from the read face of the original is guided to a lens 108 through mirrors 105, 106 and 107. The light passed through the lens 108 is color separated by an RGB color separation filter and then visualized as an image on an image pickup face of an image sensor unit 109.

By carrying the original from left to right such that it passes through the running read position, an original reading scan is performed. In this scan, it should be noted that a direction perpendicular to an original carrying direction is considered as a main-scan direction and the original carrying direction itself is considered as a sub-scan direction. That is, at the time when the original passes through the running read position, the original image is read line by line in the main-scan direction by the image sensor unit 109, and simultaneously the original is carried in the sub-scan direction, so that the whole original image is read. Further, the optically read image is converted into image data and outputted by the image sensor unit 109. The image data outputted from the unit 109 is subjected to a predetermined process, and then the obtained data is inputted to an exposure control unit 110 as a video signal.

In a case where the original image is read without using the automatic original feed unit 101, the scanner unit 104 is moved from left to right to scan the original in a state that the original mounted on the platen glass is at rest, thereby reading the original image (original fixation read).

The exposure control unit 110 modulates and outputs a laser beam on the basis of the inputted video signal, and the laser beam is irradiated onto a photosensitive drum 111 in a scanning manner. Thus, an electrostatic latent image according to the laser beam is formed on the drum 111. In this case, the unit 110 outputs the laser beam such that a correct image (i.e., not mirror image) is formed in case of the original fixation read.

The electrostatic latent image on the photosensitive drum 111 is visualized as a development-agent image by means of development agents respectively supplied from development units 112 and 113. Further, the sheet is fed from a cassette 114, a cassette 115 or a manual paper feed unit 125 at timing synchronous with start of laser beam irradiation, and the fed sheet is carried between the photosensitive drum 111 and a transfer unit 116. Then, the development-agent image formed on the drum 111 is transferred onto the fed sheet by the transfer unit 116.

The sheet onto which the development-agent image has been transferred is carried to a fixing unit 117, and the unit 117 fixes the development-agent image to the sheet by heat pressing. The sheet passed through the unit 117 is discharged outward by discharge rollers 118. In a case where double-face recording has been set, it is controlled that the sheet is guided to reverse paths 122 and 123 by a switching operation of a flapper 121, carried to a paper refeed carry path 124, and then again fed between the photosensitive drum 111 and the transfer unit 116 at the above timing. Further, in a case where a face of the sheet on which the image is formed (referred as image-formed face hereinafter) is reversed and discharged, it is controlled that the sheet is once guided into the reverse paths 122 and 123 by the switching operation of the flapper 121, carried toward the discharge rollers 118 by the switching operation of the flapper 121, and then discharged outward through the rollers 118. Hereinafter, such the control is called as a reverse paper discharge control. By the reverse paper discharge control, the sheet can be discharged in such a state as its image-formed face is turned downward.

As shown in the drawing, in a case where a later-described sheet process device (referred as finisher hereinafter) 500 is installed to the image formation apparatus 100, the apparatus is set to perform such the reverse paper discharge control.

Figure 3:
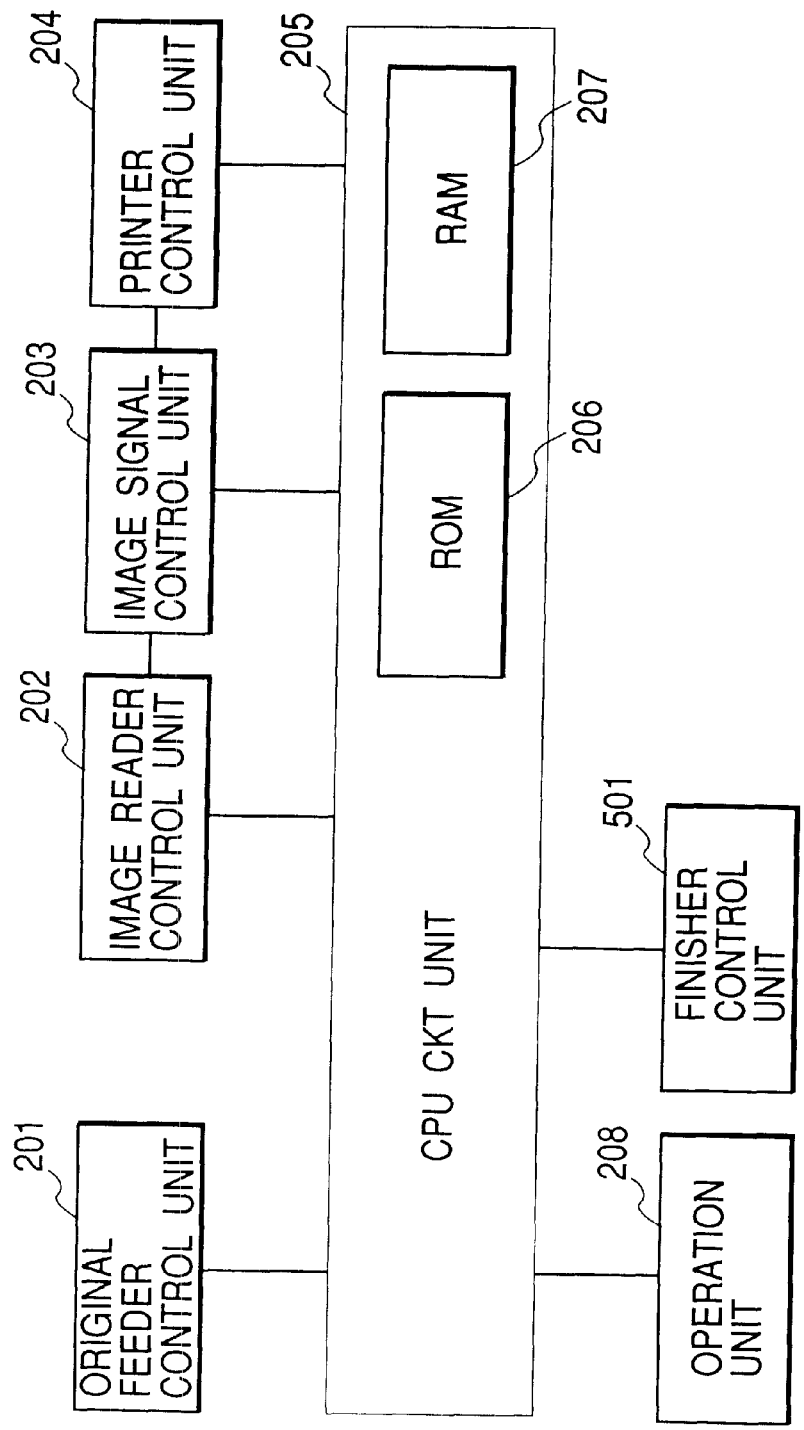
FIG. 3 is a block diagram representing a structure of a controller of the image formation apparatus shown in FIG. 1.

Subsequently, a structure of a controller to control the entire apparatus will be explained with reference to FIG. 3. FIG. 3 is the block diagram showing the structure of the controller in the image formation apparatus shown in FIG. 1.

As shown in FIG. 3, the controller has a CPU circuit unit 205 which contains therein a CPU (not shown), a ROM 206 and a RAM 207. Thus, the controller entirely controls an original feeder control unit 201, an image reader control unit 202, an image signal control unit 203, a printer control unit 204, an operation unit 208 and a finisher control unit 501, on the basis of control programs stored in the ROM 206. The RAM 207 temporarily stores control data, and is used as a working area for a calculation process in the control.

The original feeder control unit 201 drives and controls the automatic original feed unit 101 on the basis of an instruction from the CPU circuit unit 205. The image reader control unit 202 drives and controls the above scanner unit 104, the image sensor unit 109 and the like, to transfer RGB analog image signals outputted from the unit 109 to the image signal control unit 203.

The image signal control unit 203 converts each of the RGB analog image signals transferred from the unit 109 into a digital signal, performs a necessary process on the obtained digital signal, converts the processed digital signal into the video signal, and finally outputs the obtained video signal to the printer control unit 204. Such a process operation by the unit 203 is controlled by the CPU circuit unit 205. The printer control unit 204 drives the above exposure control unit 110 on the basis of the inputted video signal.

The operation unit 208 has plural keys for setting various functions concerning the image formation, a display unit for displaying information representing setting states, and the like. Thus, the unit 208 outputs a key signal corresponding to each key operation to the CPU circuit unit 205, and also displays the corresponding information on the basis of a signal from the unit 205.

The finisher control unit 501 which is installed in the finisher 500 drives and controls the finisher 500 as a whole by sending/receiving information to/from the CPU circuit unit 205. Actual controlling contents will be explained later.

Figure 4:
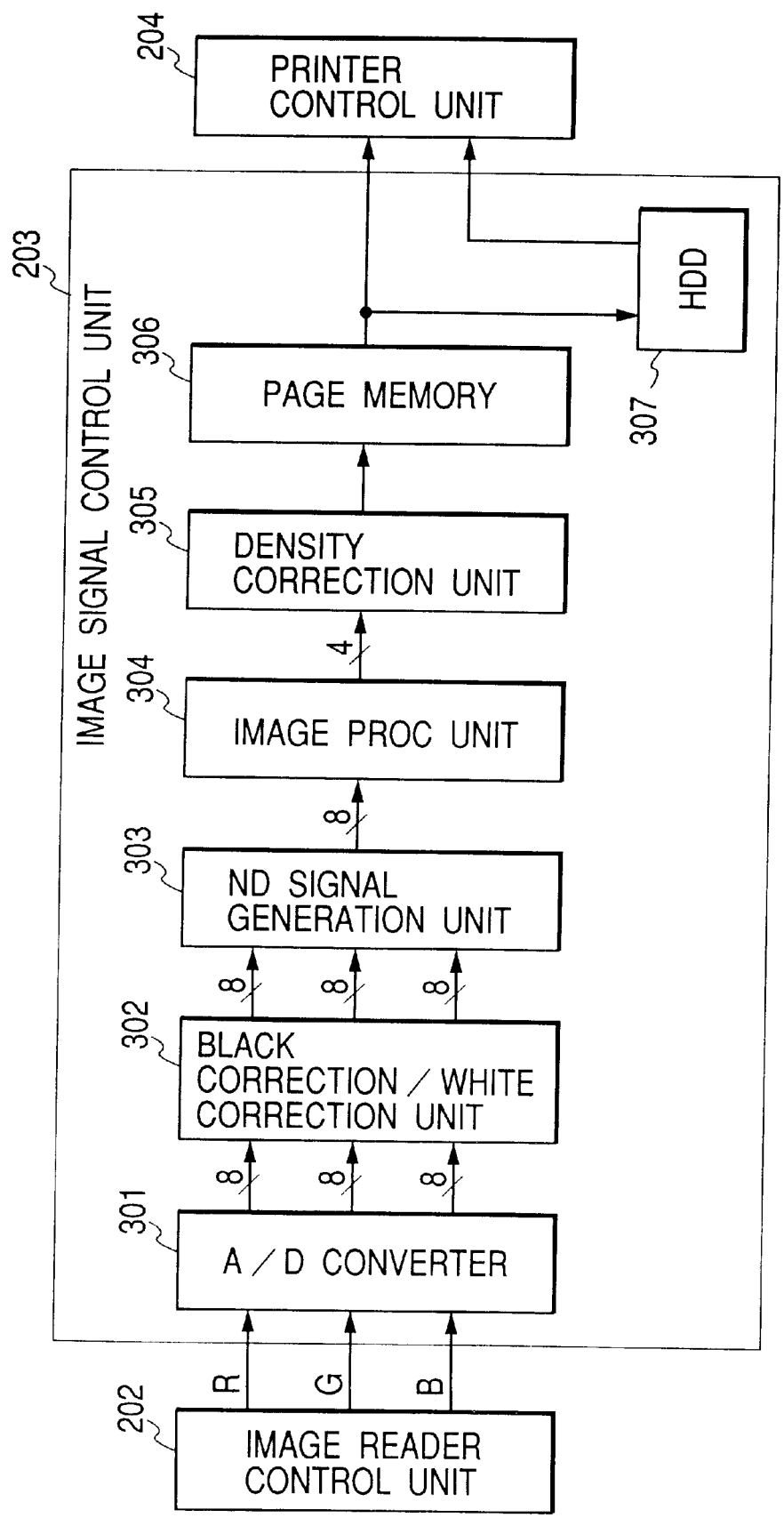
FIG. 4 is a block diagram representing a structure of an image signal control unit 203 shown in FIG. 3.

Subsequently, a structure of the image signal control unit 203 will be explained with reference to FIG. 4. FIG. 4 is the block diagram showing the structure of the image signal control unit 203 shown in FIG. 3.

As shown in FIG. 4, the image signal control unit 203 has an A/D converter 301 which converts the RGB analog image signals sent from the image reader control unit 202 into the RGB digital signals and outputs the obtained digital signals. The RGB digital signals are inputted to a black correction/white correction unit 302, and the unit 302 performs shading correction on the inputted RGB digital signals. The shading-corrected RGB digital signals are then inputted to an ND signal generation unit 303, and the unit 303 generates a luminance signal from these RGB digital signals. The generated luminance signal is then inputted to an image process unit 304. The unit 304 performs various image processes such as a zooming process (i.e., reduction and enlargement process) on the inputted luminance signal, and the processed luminance signal is then inputted to a density correction unit 305. The unit 305 performs luminance-density conversion on the inputted luminance signal, and further performs density correction at a printer. Then, the obtained signal is stored in a page memory 306 as the video data (or video signal).

The page memory 306 has a storage capacity corresponding to one page of the predetermined-size original. The video data is stored in the memory 306 in the image reading order of the above original image reading scan. At the time of original fixation read, the stored video data is read in the storing order. On the other hand, at the time of original running read, the stored video data is read in the reverse order as to the main-scan direction and in the storing order as to the sub-scan direction. That is, at the time of original running read, the image read in one direction along the main-scan direction is reversed toward a direction opposite to such one direction along the main-scan direction, whereby a mirror image process is performed.

It should be noted that the mirror image process can be achieved even in a manner that, in the original running read, the main-scan direction is reversed at the time of storing the video data in the page memory 306, and then the stored video data is read always in the determined direction.

The video data read from the page memory 306 is once stored in a hard disk drive (HDD) 307 if necessary, and the video data read from the HDD 307 is sent to the printer control unit 204 as the video signal. For example, in case of performing copy output for plural pages, the video data of the first page is directly outputted from the memory 306 to the unit 204, but the video data of the second and following pages are once stored in the HDD 307 and then sent to the unit 204.

Subsequently, an original setting state that the original is being set in the automatic original feed unit 101 and a paper discharge state that the sheet on which the original image has been formed is controlled to be inverted and then discharged will be explained with reference to FIGS. 5A to 5F. FIGS. 5A to 5F are the views showing the relation between the original setting state and the paper discharge state.

Figure 5A:
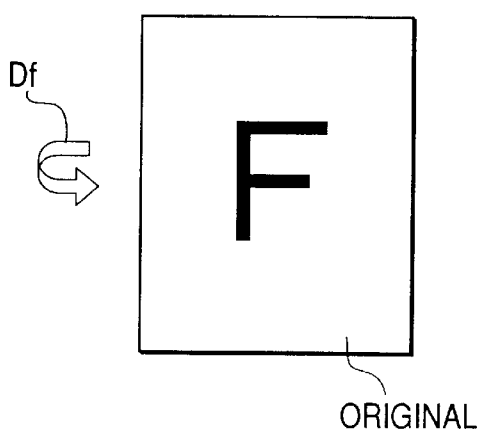
FIGS. 5A, 5B, 5C, 5D, 5E and 5F are views representing relation between an original set state in an automatic original feed unit 101 and a state that a sheet on which an original image has been formed is discharged under reverse paper discharge control.

In the embodiment, as shown in FIG. 5A, the original of which read face has been turned upward is set on the original tray 130 of the automatic original feed unit 101 such that the first page of the original is put on uppermost.

Figure 5B:
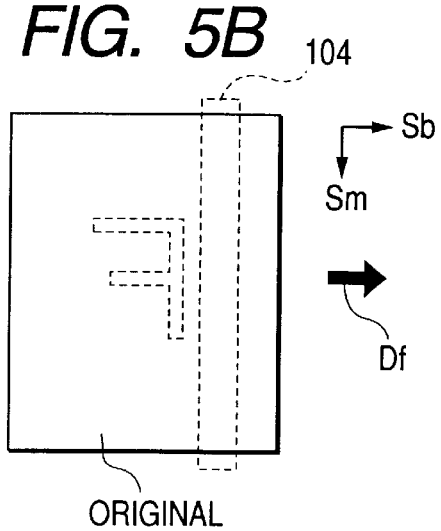
Figure 5C:
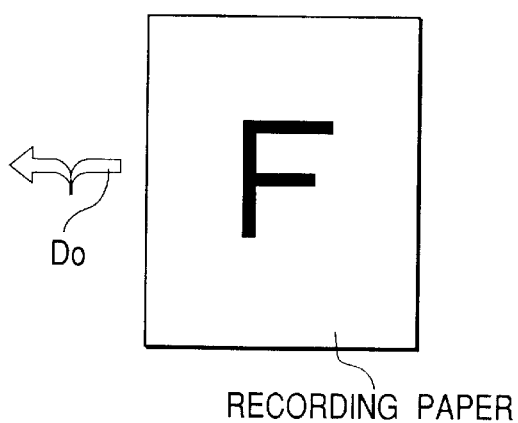
Figure 5D:
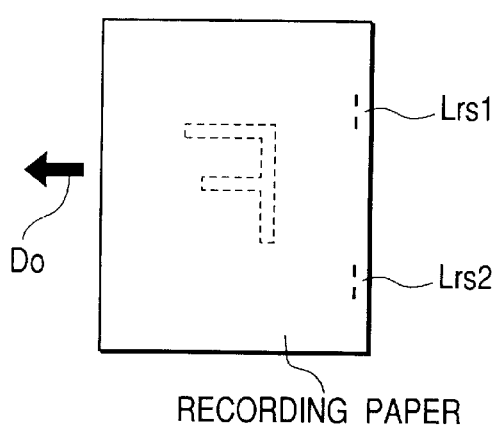
Figure 5E:
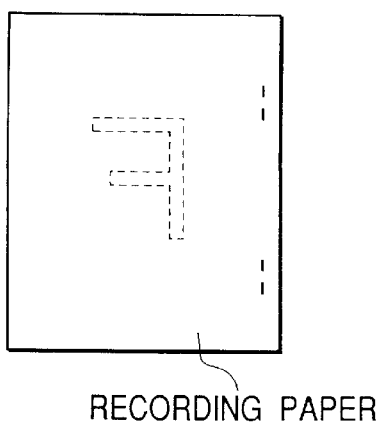
Figure 5F:
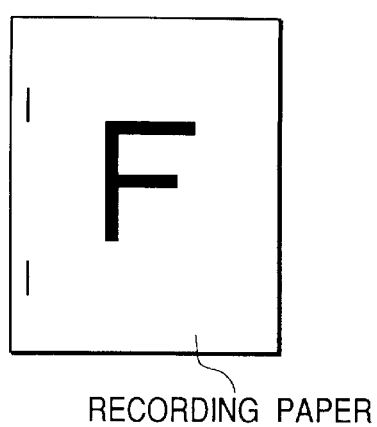

In such the original setting state, the automatic original feed unit 101 feeds and carries the original from its first page (i.e., uppermost page) in due order, to the platen glass 102. On the glass 102, as shown in FIG. 5B, the original of which read face is opposite to an upper face of the glass 102 is carried in a Df direction. At the time when the original passes through the running read position, the image on the read face of the original is read in a main-scan direction Sm by the scanner unit 104 supported at the running read position. Thus, as the image on the read face of the original is read in the main-scan direction Sm, the original is carried in the Df direction (i.e., sub-scan direction Sb), whereby the original reading scan is performed for the entire read face. If the running-read image is formed as it is, this image becomes a mirror image. Therefore, to prevent this, the read image is subjected to the above mirror image process and then formed on the sheet in such an image formation process as above. As a result, as shown in FIG. 5C, the image facing toward the same direction as that at the time of the original setting state is formed on the image formation face (i.e., upper face) of the sheet, and the sheet passes through the fixing unit 117. This sheet is subjected to the above reverse paper discharge control, and the sheet of which image formation face has been turned downward is then discharged in a Do direction as shown in FIG. 5D. Then, as shown in FIG. 5E, a trailing edge is staple processed. Thus, as shown in FIG. 5F, the recording sheet of which left side has been bound or stapled can be obtained.

Figure 2:
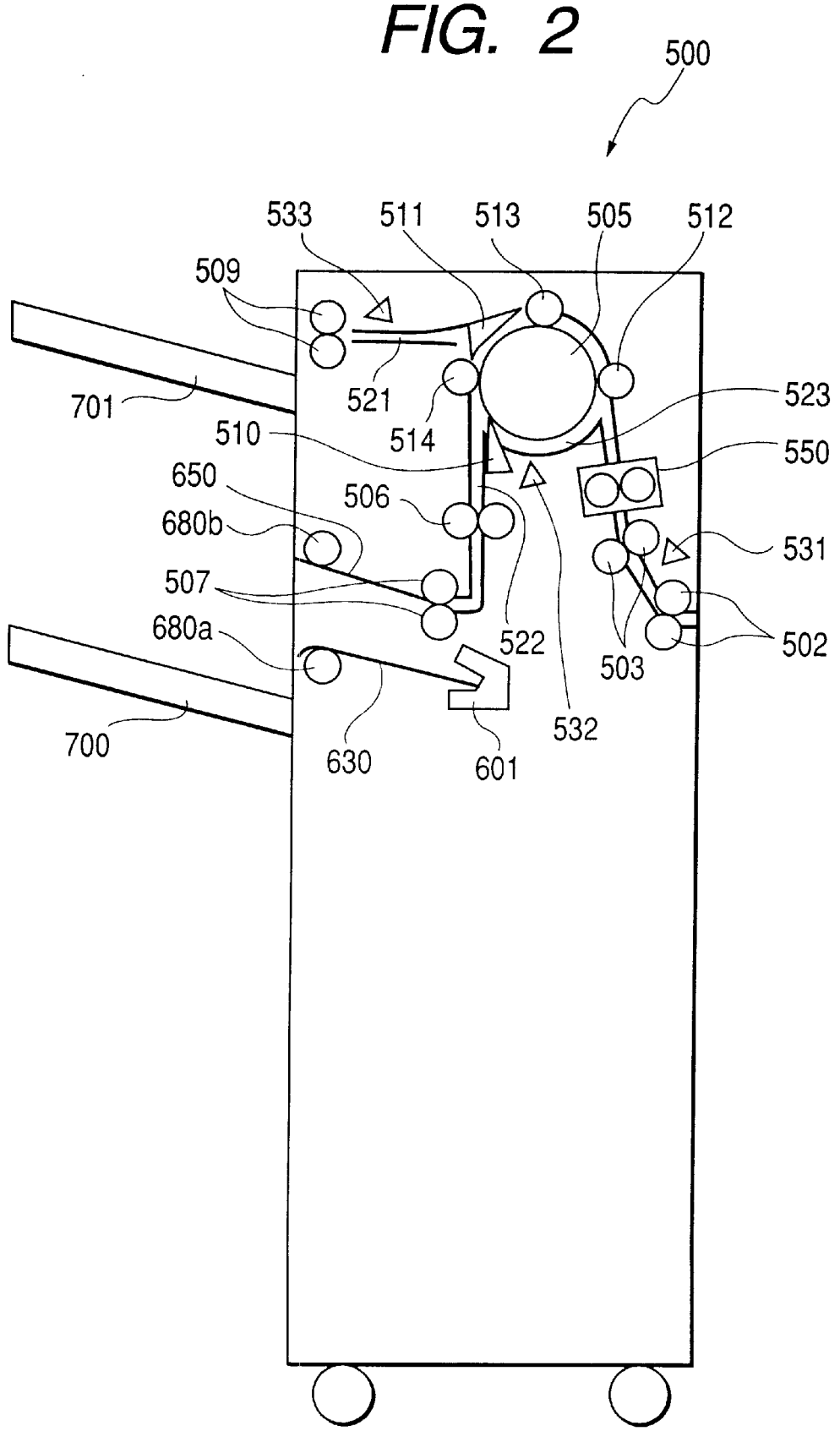
FIG. 2 is a structural view of a finisher 500.

Subsequently, a structure of the finisher 500 will be explained with reference to FIG. 2. FIG. 2 is the sectional view showing the structure of the finisher 500 shown in FIG. 1.

The finisher 500 performs various sheet postprocesses such as a process to sequentially take in the plural sheets discharged from the image formation apparatus 100, adjust or align the took-in sheets and sheaf the adjusted sheets, a staple process to bind or staple a trailing edge of an obtained sheaf by a stapler, a punch process to punch holes in the trailing edge side of the sheaf, a sort process, a nonsort process and the like. When the finisher 500 is connected to the apparatus 100 and the original running read is performed, the image corrected through the mirror process is formed on the sheet in the apparatus 100, and the sheet of which image formation face has been turned downward in the reverse paper discharge control is then discharged from the apparatus 100. Subsequently, in the finisher 500, the above various processes such as the staple process and the like are performed on the above discharged sheet.

As shown in FIG. 2, the finisher 500 takes in the sheet discharged from the image formation apparatus 100 by a pair of inlet rollers 502, and the took-in sheet is then carried toward a buffer roller 505 by a pair of carrier rollers 503. An inlet sensor 531 is provided at the halfway position on the carrier path between the rollers 502 and the rollers 503, and a punch unit 550 is provided at the halfway position on the carrier path between the rollers 503 and the roller 505. If necessary, the punch unit 550 operates to punch the holes in the trailing edge side of the carried sheet.

The buffer roller 505 can layer and wind thereon a predetermined number of sheets carried by the rollers 503. That is, while the roller 505 is rotating, the sheet is wound around an outer periphery of the roller 505 by pressure rollers 512, 513 and 514, and the wound sheet is then carried in a rotational direction of the roller 505.

A switch flapper 511 is provided between the pressure rollers 513 and 514, and a switch flapper 510 is provided at a downstream side of the roller 514. The flapper 511 separates the wound sheet from the buffer roller 505 and guides the separated sheet to a nonsort path 521 or a sort path 522. The flapper 510 separates the wound sheet from the roller 505 and guides the separated sheet to the sort path 522, or guides the sheet wound around the roller 505 to a buffer path 523 as it is.

When the sheet wound around the roller 505 is guided to the nonsort path 521, the wound sheet is separated from the roller 505 and guided to the path 521 by the switch flapper 511. The sheet guided to the path 521 is then discharged onto a sample tray 701 through a pair of discharge rollers 509. A paper discharge sensor 533 is provided at the halfway position on the nonsort path 521.

When the sheet wound around the buffer roller 505 is guided to the buffer path 523, both the switch flappers 510 and 511 do not operate. Thus, the sheet is carried to the path 523 in the state that the sheet is being wound around the roller 505. A buffer path sensor 532 is provided at the halfway position on the path 523 to detect the sheet thereon.

When the sheet wound around the buffer roller 505 is guided to the sort path 522, the switch flapper 511 does not operate but only the switch flapper 510 operates to separate the wound sheet from the roller 505. The plural sheets separated are then guided to the sort path 522 and stacked or put on an intermediate tray (referred as process tray hereinafter) 630 through pairs of carrier rollers 506 and 507. The sheets stacked on the process tray 630 in the form of sheaf are subjected to an adjustment process, a staple process and the like, if necessary. Then, the processed sheets are discharged onto a stack tray 700 by discharge rollers 680a and 680b. The roller 680b is supported by a rocker guide 650, and the guide 650 rocks (or swings) the roller 680b by a rocker motor (not shown) such that the roller 680b comes into contact with the uppermost sheet on the tray 630. In the state that the roller 680b contacts with the uppermost sheet on the tray 630, the roller 680b can cooperate with the roller 680a to discharge the sheaf of sheets on the tray 630 toward the stack tray 700.

The above staple process is performed by a stapler 601. The stapler 601 is arranged to be movable along one edge (outer edge) of the process tray 630, and can bind or staple the sheaf of sheets stacked on the tray 630 at its endmost position (i.e., trailing edge) (see FIGS. 21 to 23) of the sheet in a paper carrying direction (leftward direction in FIG. 2).

Figure 18:
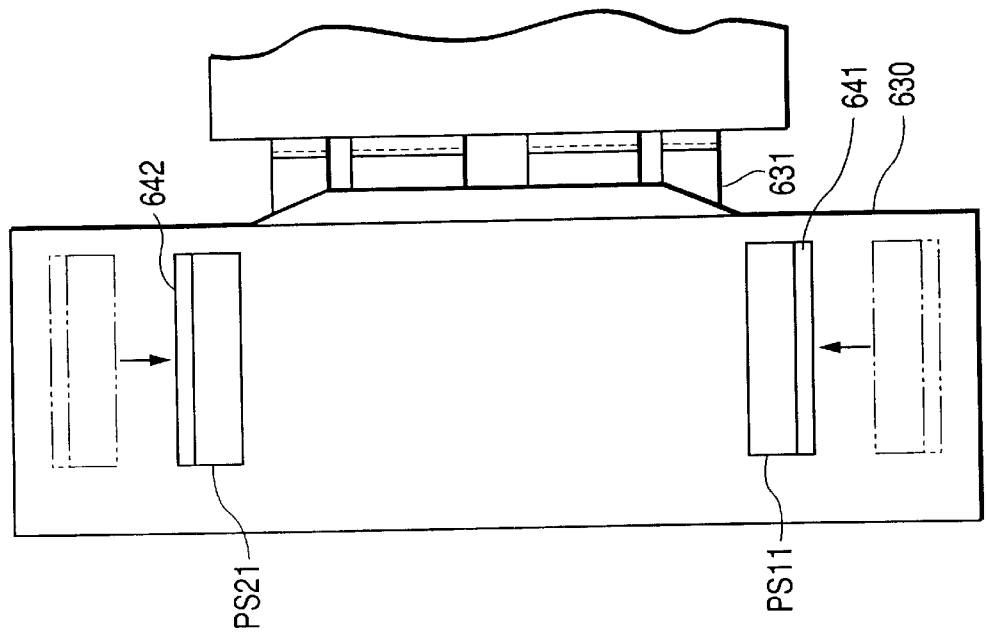
FIG. 18 is a view for explaining an adjustment operation on a process tray 630 in the finisher shown in FIG. 2.

Subsequently, an adjustment (or alignment) operation in the finisher 500 will be explained with reference to FIGS. 18 to 20. FIGS. 18 to 20 are the views showing the adjustment operation to be performed on the process tray 630 of the finisher 500 shown in FIG. 2.

As shown in FIG. 18, when the initial sheet is discharged from the image formation apparatus 100 onto the process tray 630, front-side and rear-side adjustment members 641 and 642 being on standby at home positions (indicated by alternate long and two short dashed lines) are previously moved to respective positions PS11 and PS21 slightly away from a width of the sheet to be discharged (i.e., distance between PS11 and PS21 is slightly wider than sheet width). As shown in FIG. 19, the sheet discharged on the tray 630 is dropped between the members 641 and 642 as its trailing edge is being supported by a stopper 631, and then the member 641 is moved to a position PS12 at the timing when the downward face of the discharged sheet comes into contact with a support face of the tray 630. By such movement of the member 641, the sheet is moved to a first adjustment position 690 and adjusted.

After adjusting the first sheet, as shown in FIG. 19, the front-side adjustment member 641 is returned to the position PS11 and is on standby for the next sheet to be discharged onto the tray 630. When the next sheet is discharged onto the tray 630, the member 641 is again moved to the position PS12 to adjust the next sheet at the first adjustment position 690. During this operation, the rear-side adjustment member 642 is maintained to be at a position PS22 to act as an adjustment standard.

The above operation is repeated until the final sheet in the sheaf is processed. When the discharge and adjustment of the first sheaf of sheets completes, a later-described sheaf discharge is performed to move the sheaf to the stack tray 700.

After the first sheaf is discharged onto the stack tray 700, as shown in FIGS. 19 and 20, the front-side adjustment member 641 is moved from the position PS12 to a position PS13, and also the rear-side adjustment member 642 is moved from the position PS22 to a position PS23. Subsequently, when the first (initial) sheet in the second sheaf is discharged onto the process tray 630, this sheet is similarly dropped between the members 641 and 642 as its trailing edge is being supported by the stopper 631. Then, the member 642 is moved from the position PS23 to a position PS24 at the timing when the downward face of the discharged sheet comes into contact with the support face. By such movement of the member 642, the sheet is moved to a second adjustment position 691 and adjusted. For the second and subsequent sheets, the member 642 is moved to the position PS23 and on standby for the sheet next discharged onto the tray 630. When the discharge of the next sheet onto the tray 630 completes, the member 642 is again moved to the position PS24 to adjust the sheet at the second adjustment position 691. During this operation, the front-side adjustment member 641 is maintained to be at the position PS13 to act as the adjustment standard. The above operation is repeated until the final sheet in the sheaf is processed. When the discharge and adjustment of the second sheaf completes, the later-described sheaf discharge is performed to move the sheaf to the stack tray 700. As shown in FIG. 20, the first adjustment position 690 is far from, in the rear of the tray 630, the second adjustment position 691 by a predetermined amount (i.e., offset distance L).

Figure 17:
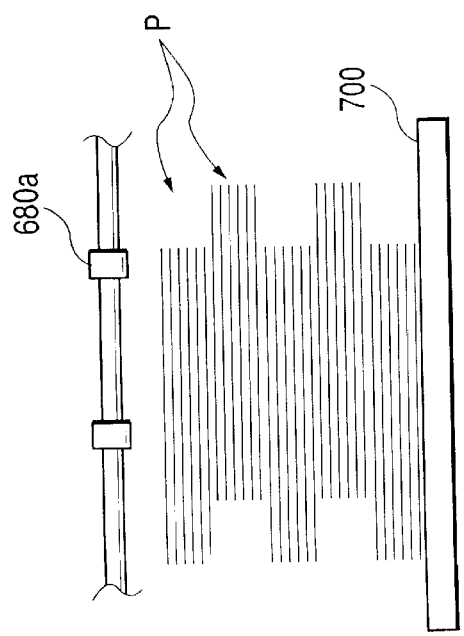
FIG. 17 is a view showing a stack state of plural sheaves of sheets on a stack tray 700 of the finisher 500.

After then, the adjustment is performed as the adjustment position of each sheaf is alternately changed or switched between the positions 690 and 691. Thus, as shown in FIG. 17, the plural sheaves of which adjustment positions are alternately changed are stacked on the stack tray 700. That is, by alternately changing the adjustment position for each sheaf, sorting is performed in the offset distance L for the respective sheaves.

The offset distance L is set to be different in each of the sort mode and the staple-sort mode. For example, in the staple-sort mode, the offset distance L is set to have an amount (i.e., distance) L1 sufficient to prevent an overlap of staples (or styli) between the stacked sheaves adjacent to each other. On the other hand, in the sort mode, the offset distance L is set to be a distance L2 sufficient to certainly distinguish the adjacent sheaves from each other. The offset distances L1 and L2 satisfy relation of L1<L2, and process speed in the staple mode can be improved by such setting.

Figure 23:
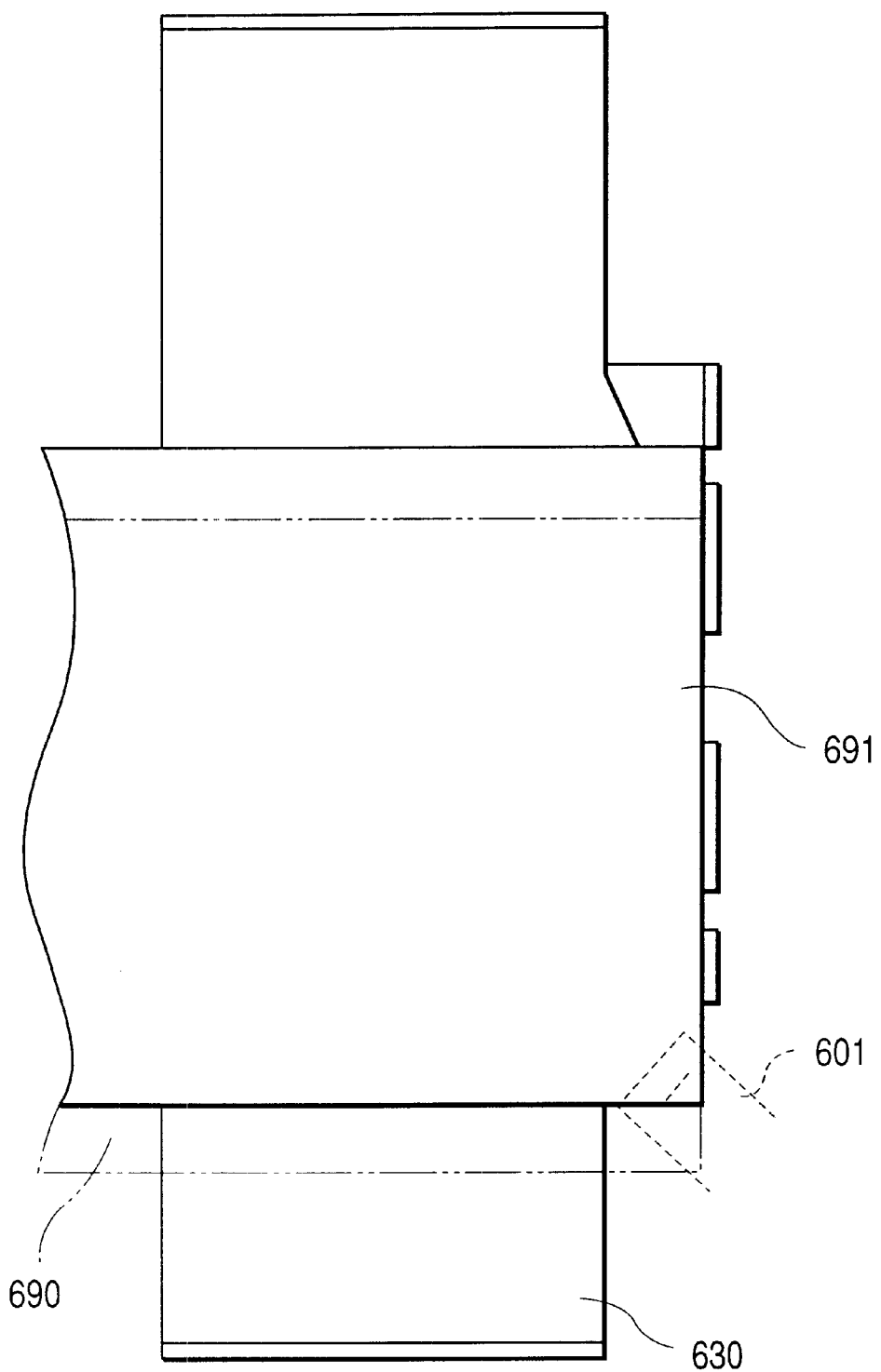
FIG. 23 is a view for explaining the operating state according to the binding mode (front-oblique binding mode, rear-oblique binding mode, or two-point binding mode) of the stapler 601.

Subsequently, the staple operation will be explained with reference to FIGS. 21 to 23. FIGS. 21 to 23 are the views for explaining operation states according to the binding modes (i.e., front-oblique binding mode, rear-oblique binding mode and two-point binding mode) of the stapler 601.

In the staple mode, the stapler 601 is previously on standby at a desired clinch position for the adjusted sheets. Thus, when the discharge and adjustment of the final sheet in the final sheaf completes, the stapler 601 performs the staple operation. In this case, the stapler 601 is controlled to offset-move in synchronism with offset movement (movement amount L1) of the sheaf.

Further, the stapler 601 changes its direction and moves according to the binding modes (i.e., front-oblique binding mode, rear-oblique binding mode and two-point binding mode).

For example, as shown in FIG. 21, in the two-point binding mode, the staple operation to staple the sheaf, at two points on its trailing edge side, adjusted at each of the adjustment positions 690 and 691 is performed. As shown in FIG. 22, in the rear-oblique binding mode, the staple operation to obliquely staple the sheaf, at its trailing-edge rear point, adjusted at each of the adjustment positions 690 and 691 is performed. As shown in FIG. 23, in the front-oblique binding mode, the staple operation to obliquely staple the sheaf, at its trailing-edge front point, adjusted at each of the adjustment positions 690 and 691 is performed. In each of FIGS. 21 to 23, an alternate long and two short dashed line represents the first adjustment position 600, and a solid line represents the second adjustment position 691. At this time, in a case where the adjustment position is in front of the discharge position, the rear-side adjustment member 642 reciprocates to carry the sheet to the front-side adjustment member 641 side being the adjustment standard. On the other hand, in a case where the adjustment position is in the rear of the discharge position, the front-side adjustment member 641 reciprocates to carry the sheet to the rear-side adjustment member 642 side.

Subsequently, the sheaf discharge operation in the staple mode will be explained.

In one-point staple sort mode, when the above adjustment operation terminates, the stapler 601 starts the staple operation. Further, during the adjustment operation or staple operation, the rock guide 650 starts descent. In this case, speed of the rocker guide motor is controlled such that the paper discharge roller 680*b* is put on the sheaf about that time when the staple operation terminates.

Descent start timing of the rock guide 650 is variable according to the number of sheets of the sheaf stacked on the process tray 630. That is, if such the number is small, since a movement distance up to putting of the roller 680*b* on the sheaf is long and an operation time of the stapler 601 is short, the rocker guide 650 starts descent while the adjustment operation is being performed. On the other hand, if such the number is large, since the movement distance up to putting of the roller 680*b* on the sheaf is short and the operation time of the stapler 601 is long, the rocker guide 650 starts descent substantially at the same time when the staple operation starts.

After elapsing a predetermined time from putting of the roller 680*b* on the sheaf to an end of a bound of the roller 680*b*, it is judged whether or not the staple operation terminates. If the operation terminates, the sheaves are discharged onto the stack tray 700 by the rollers 680*a* and 680*b*. On the other hand, if the operation does not terminate, a process waits for termination of the staple operation. In such a state waiting for the termination of the staple operation, sheaf discharge speed control is performed. In this control, the sheaf is carried at high speed after the sheaf carrying starts. However, the discharge speed is reduced before the trailing edge of the sheaf exceeds the trailing edge of the rollers 680*a* and 680*b*, such that the discharge speed becomes suitable for stacking the sheaves onto the stack tray 700 in case of the sheaf discharging.

In the two-point staple sort mode, the rocker guide starts descent when the staple operation at a first staple point terminated and thus the stapler moves to a second staple point. While the second point is being stapled, the rocker guide 650 is on standby as it is being put on the sheaf. The paper discharge roller 680*b* starts the sheaf discharge operation at the same time when the staple operation terminates. The following operation is identical with that in the one-point staple sort mode.

Subsequently, a flow of the sheet in the finisher 500 will be explained for each of the nonsort mode, the staple-sort mode and the sort mode.

Figure 6:
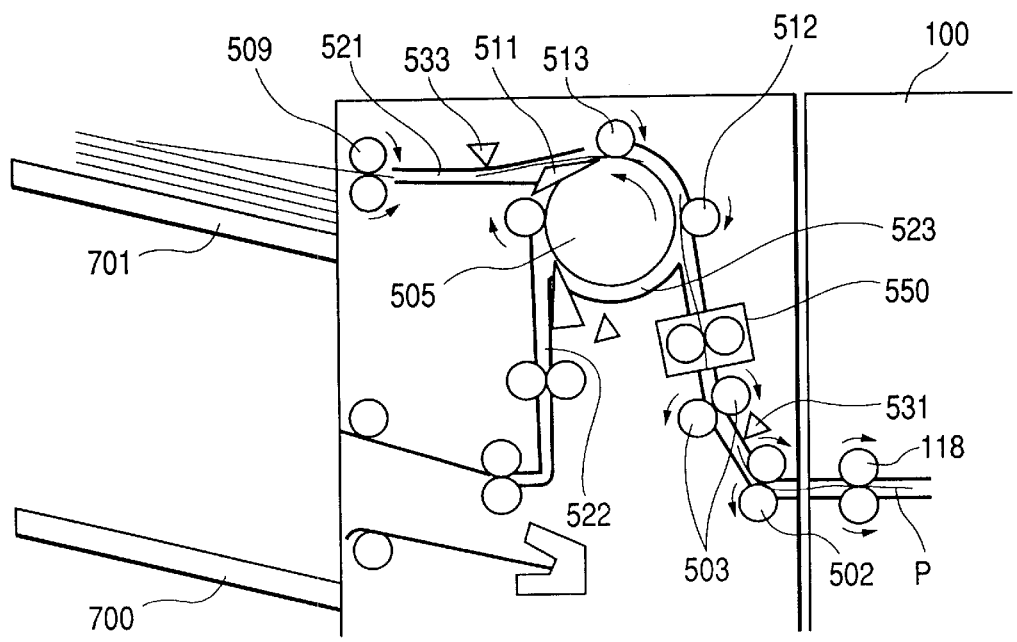
FIG. 6 is a view showing a flow of a sheet in a nonsort mode in the finisher 500.

Initially, the flow of the sheet in the nonsort mode will be explained with reference to FIG. 6. FIG. 6 is the view showing the flow of the sheet in the finisher 500 in the nonsort mode.

When a user designates, in the image formation apparatus 100, the paper discharge mode as the nonsort mode, as shown in FIG. 6, then the inlet rollers 502, the carrier rollers 503 and the buffer roller 505 are rotatively driven, whereby a sheet P discharged from the apparatus 100 is taken in the finisher 500 and then carried. The switch flapper 511 is rotatively driven by a solenoid (not shown) to a position shown in the drawing, whereby the sheet P is guided into the nonsort path 521. Then, when the paper discharge sensor 533 detects a trailing edge of the sheet P, then the discharge rollers 509 rotate at a speed suitable for the stacking and discharge the sheet P onto the sample tray 701.

Subsequently, the flow of the sheet in the staple-sort mode will be explained with reference to FIGS. 7 to 14B and 17. FIGS. 7 to 14B are the views showing the flow of the sheet in the staple-sort mode, and FIG. 17 is the view showing a state that the plural sheaves of sheets are stacked on the stack tray 700 in the finisher 500.

Figure 7:
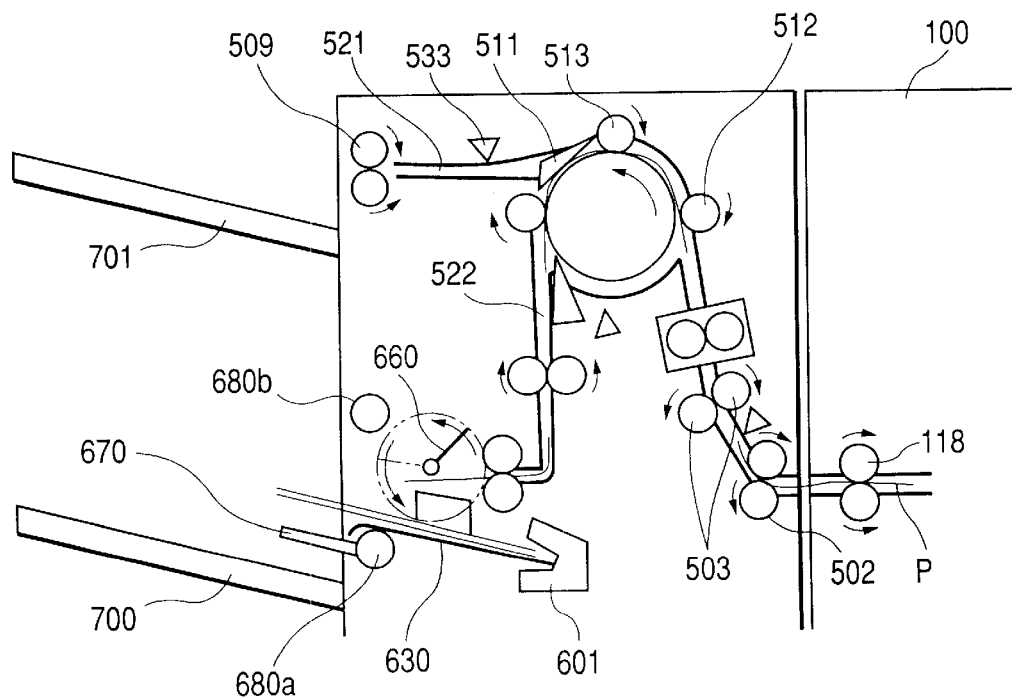
FIG. 7 is a view showing a flow of a sheet in a staple-sort mode in the finisher 500.

When the staple-sort mode is designated by the user, as shown in FIG. 7, then the inlet rollers 502, the carrier rollers 503 and the buffer roller 505 are rotatively driven, whereby the sheet P discharged from the apparatus 100 is taken in the finisher 500 and then carried. The switch flappers 510 and 511 are stopped at positions shown in the drawing, whereby the sheet P is guided into the sort path 522. Then, the sheet P guided in the path 522 is discharged onto the process tray 630 by the carrier rollers 507. At this time, dangling, insufficient returning or the like of the sheet P discharged by the rollers 507 can be prevented by a projection tray 670 projected upward. Also, alignment of the sheets on the tray 630 can be improved by the tray 670.

The sheet P discharged on the process tray 630 starts moving on the tray 630 toward the stopper 631, by its own weight. Such movement of the sheet P is assisted by an assist member such as a paddle or the like (not shown). When the trailing edge of the sheet P hits against the stopper 631 and thus the sheet P stops, then the discharged sheets are adjusted by the adjustment members 641 and 642 as described above. When the predetermined number of sheets P are adjusted and stacked, then the above staple operation and the sheaf discharge operation are performed, whereby the sheaf of sheets P are discharged onto the stack tray 700. As described above, since the sheet of which image-formed face was turned downward is discharged from the image formation apparatus 100, the first page of which image-formed face was turned downward is at the lowermost position in the sheaf consisting of the predetermined number of adjusted sheets stacked upward in the page order. Further, the sheaf is bound at a position Ls (upper right position Lrs1 or lower right position Lrs2) shown in FIG. 5.

Subsequently, the flow of the sheets constituting the next (i.e., second) sheaf will be explained. This flow occurs while the sheet P of the first sheaf is took in and then the first sheaf is discharged.

Figure 8:
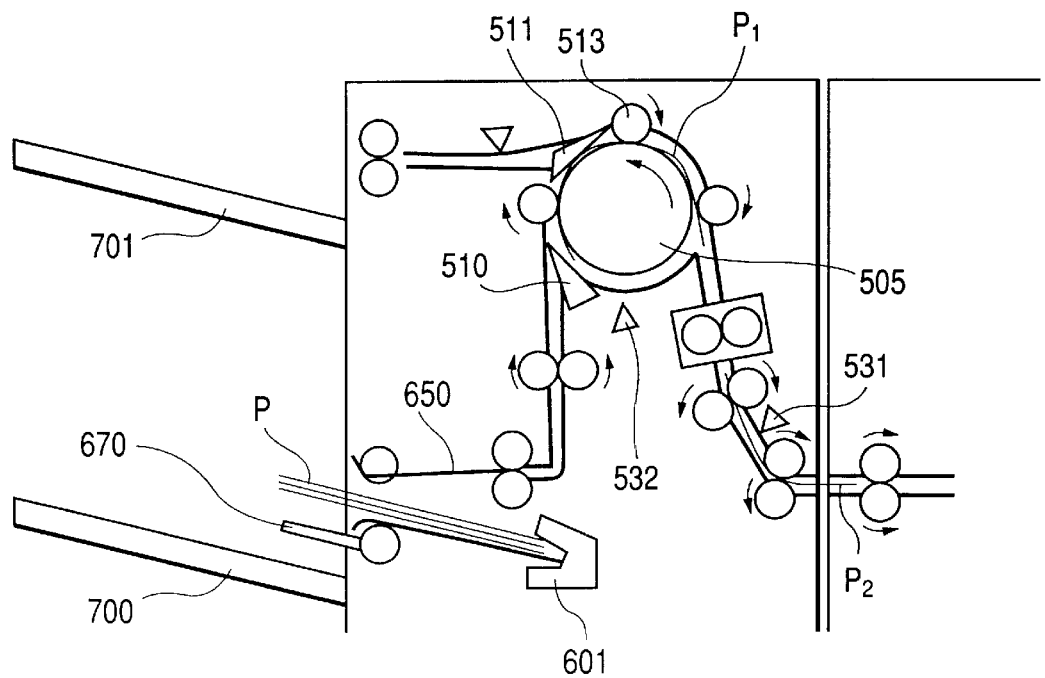
FIG. 8 is a view showing the flow of a sheet in the staple-sort mode in the finisher 500.
Figure 9:
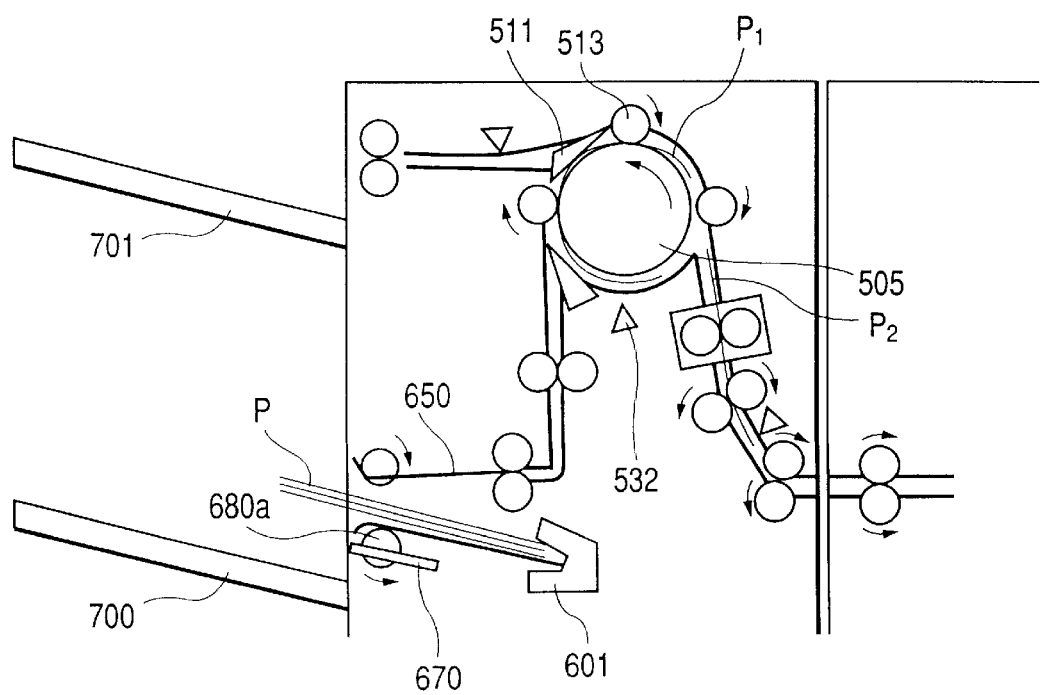
FIG. 9 is a view showing the flow of a sheet in the staple-sort mode in the finisher 500.
Figure 10:
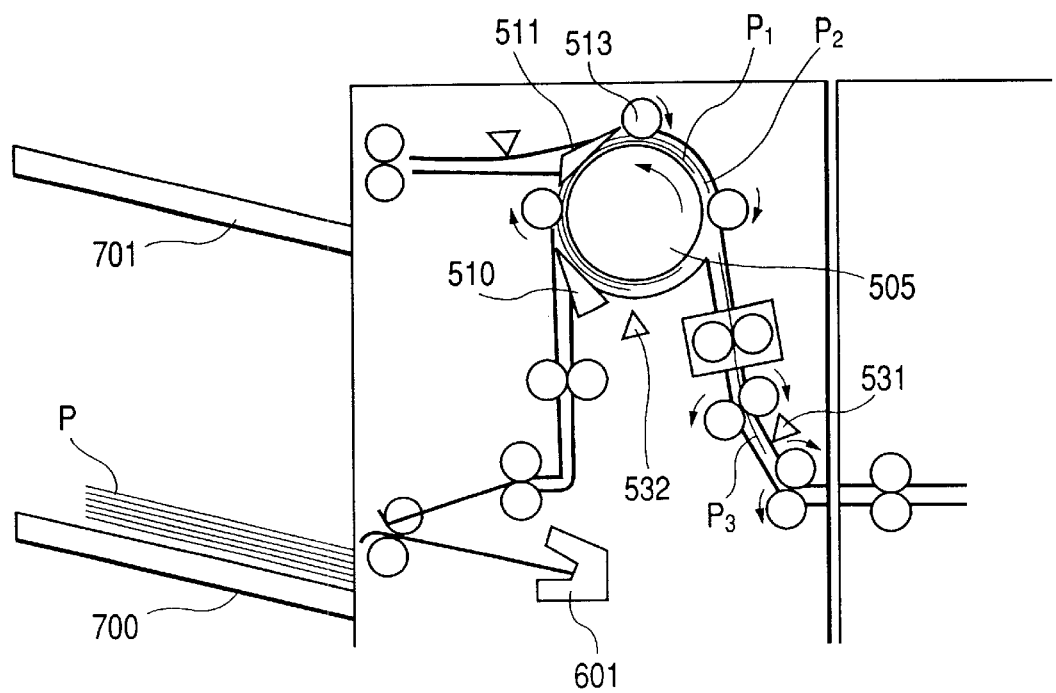
FIG. 10 is a view showing the flow of a sheet in the staple-sort mode in the finisher 500.
Figure 11:
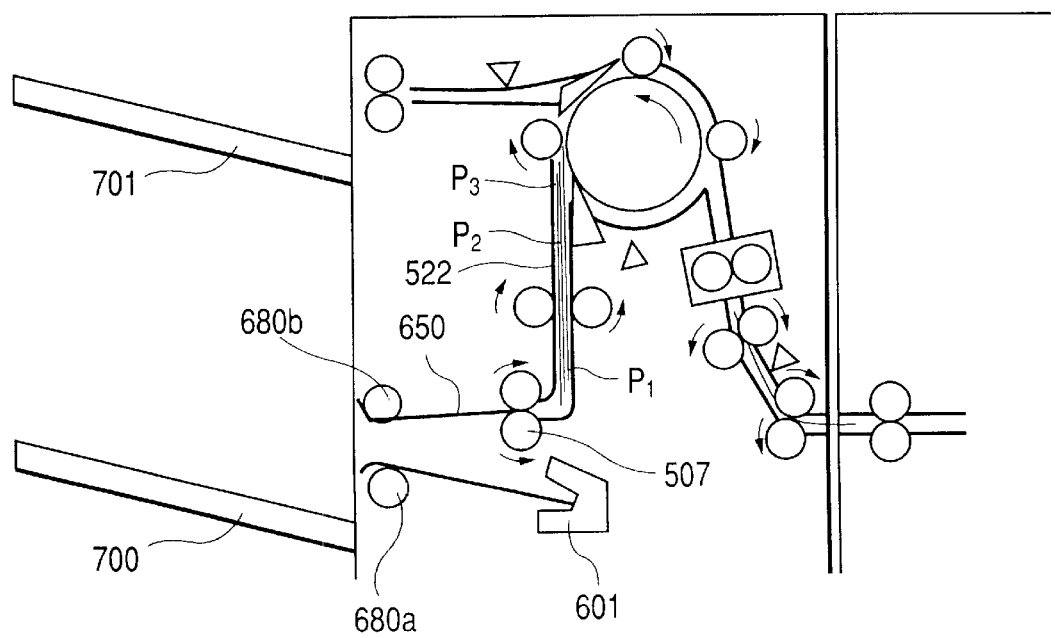
FIG. 11 is a view showing the flow of a sheet in the staple-sort mode in the finisher 500.
Figure 12:
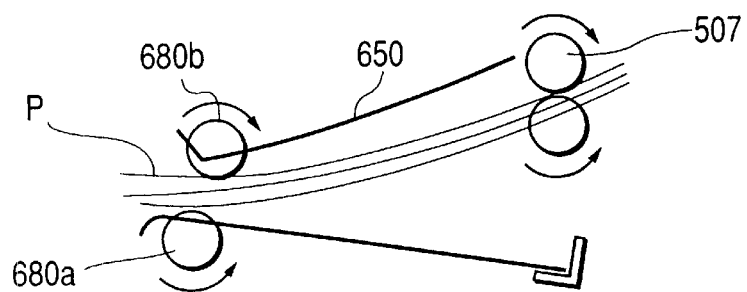
FIG. 12 is a view showing the flow of a sheet in the staple-sort mode in the finisher 500.

As shown in FIG. 8, a sheet P1 of the first page in the next (i.e., second) sheaf discharged from the image formation apparatus 100 is wound around the buffer roller 505 by operating the switch flapper 510. The roller 505 carries the sheet P1 to a position far from the buffer path sensor 532 for a predetermined distance and then stops. As shown in FIG. 9, when a leading edge of a sheet P2 of the next page advances from the inlet sensor 531 for a predetermined distance, then the buffer roller 505 starts rotating, whereby the next sheet P2 is overlaid on the sheet P1 such that the sheet P2 is advanced from the sheet P1 by a predetermined distance. As shown in FIG. 10, the sheet P2 is wound around the buffer roller 505 in a state that the sheet P2 is being overlaid on the sheet P1, and then carried to the buffer path sensor 532. After then, the buffer roller 505 again carries the sheet P2 to the position far from the sensor 532 for the predetermined distance and then stops. Further, as shown in FIG. 10, when a leading edge of a sheet P3 of the next page advances from the inlet sensor 531 for the predetermined distance, then the buffer roller 503 again starts rotating. Thus, the sheet P3 is overlaid on the sheaf of the sheets P1 and P2 such that the sheet P3 is advanced from the sheaf for a predetermined distance. The sheets P1, P2 and P3 wound around the roller 505 are separated therefrom by the switch flapper 511 and carried to the sort path 522 as the sheaf P of the three sheets. At this time, the discharge operation of the sheaf P on the process tray 630 has terminated. Thus, as shown in FIG. 12, the rock guide 650 has been descended and its descended position is maintained, whereby the sheaf P of the three sheets is took in between the discharge rollers 680a and 680b.

Figure 13:
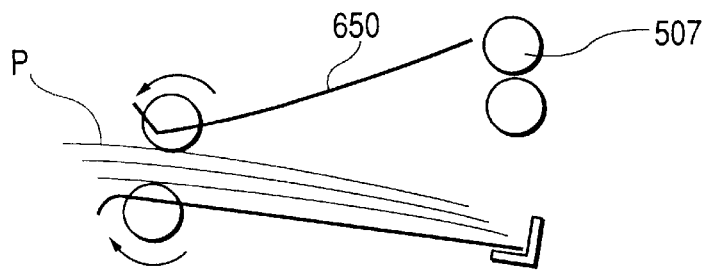
FIG. 13 is a view showing the flow of a sheet in the staple-sort mode in the finisher 500.
Figure 14A:
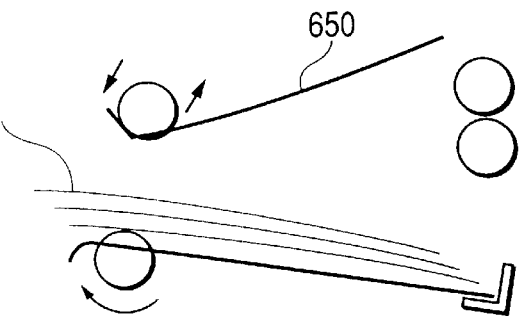
FIGS. 14A and 14B are views showing the flow of a sheet in the staple-sort mode in the finisher 500.
Figure 14B:
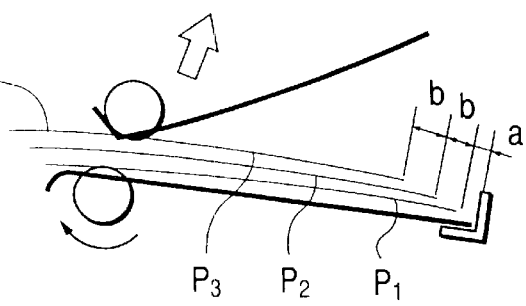

Subsequently, as shown in FIG. 13, when the trailing edge of the sheaf P exceeds the carrier rollers 507 and reaches the process tray 130, then the discharge rollers 680a and 680b reverse-rotate to carry the sheaf P toward the stopper 631. As shown in FIG. 14A, before the trailing edge of the sheaf P hits against the stopper 631, the rocker guide 650 ascends to separate the roller 680b from the sheet face. As shown in FIG. 14B, in case of carrying the sheaf P consisting of the plural sheets, each sheet is offset in the carrying direction. That is, the sheet P2 is offset from the sheet P1 toward the side opposite to the stopper 631 side, and also the sheet P3 is similarly offset from the sheet P2.

The fourth and subsequent sheets are discharged onto the process tray 630 through the sort path 522 in the same manner as in the discharge operation of the first sheaf. After the second sheaf is stacked on the stack tray 700, the subsequent sheaves are processed by repeating the same operation, whereby the predetermined number of sheaves are stacked on the tray 700. As shown in FIG. 17, the plural sheaves are stacked on the stack tray 700 such that the sheaves are alternately offset. Further, in each sheaf, the first-page sheet of which image-formed face was turned downward is at the lowermost position, and the subsequent sheets are stacked upward in the page order.

Figure 15:
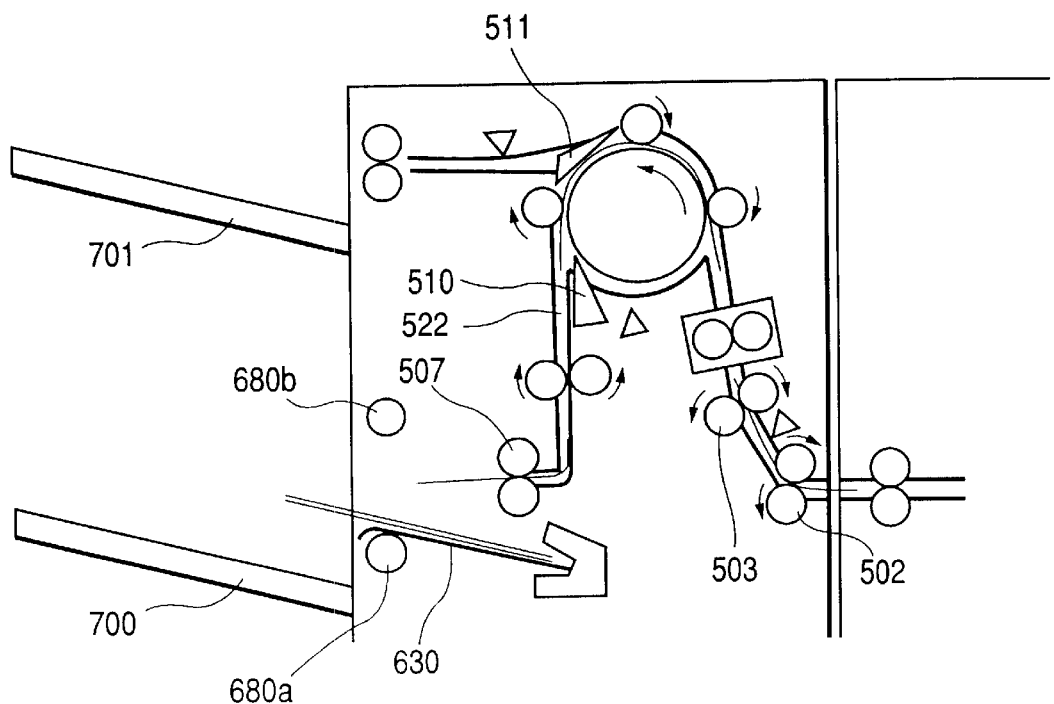
FIG. 15 is a view showing the flow of a sheet in a sort mode in the finisher.
Figure 16:
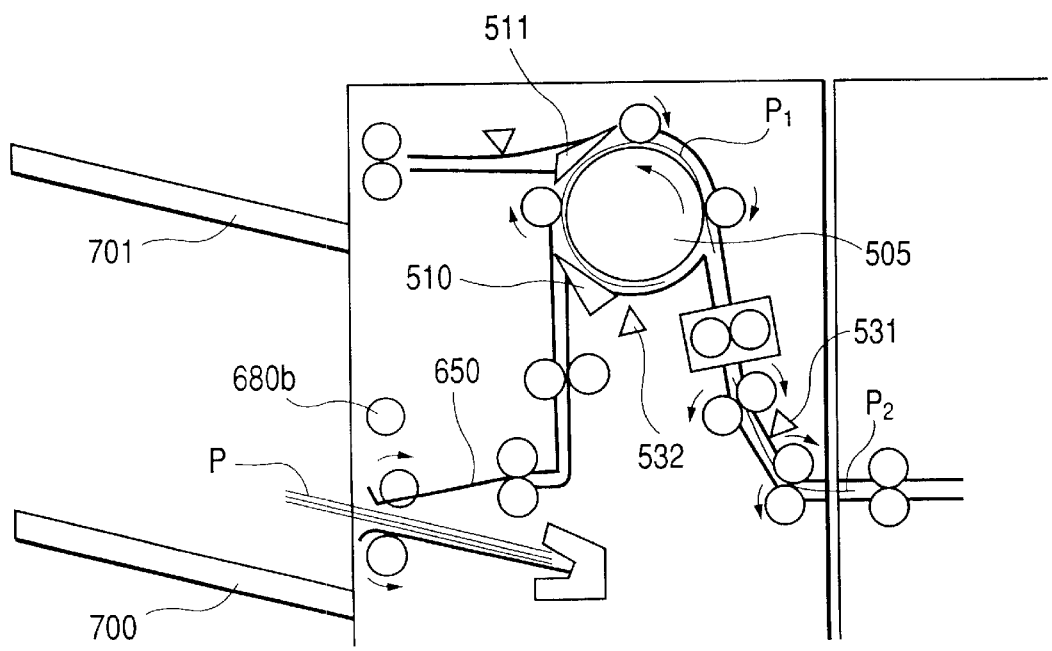
FIG. 16 is a view showing the flow of a sheet in the sort mode in the finisher.

Subsequently, the flow of the sheets in the sort mode will be explained with reference to FIGS. 15 and 16. FIGS. 15 and 16 are the views showing the flow of the sheets in the finisher in the sort mode.

As shown in FIG. 15, when the sort mode is set, then the inlet rollers 502 and the carrier rollers 503 are rotatively driven, whereby the sheets discharged from the image formation apparatus 100 are sequentially stacked on the stack tray 630, in the same manner as in the staple-sort mode. Then, the above sheaf discharge operation is performed to discharge the sheaf P onto the stack tray 700. On the other hand, during this operation, as shown in FIG. 16, the sheet P1 discharged from the apparatus 100 is wound around the buffer roller 505 by operating the switch flapper 510. The roller 505 carries the sheet P1 to the position far from the buffer path sensor 532 for the predetermined distance and then stops. Subsequently, when the leading edge of the next sheet P2 advances from the inlet sensor 531 for the predetermined distance, then the buffer roller 505 starts rotating, whereby the next sheet P2 is overlaid on the sheet P1 such that the sheet P2 is advanced from the sheet P1 by the predetermined distance.

As above, the same operation as in the staple-sort mode is performed in the sort mode, whereby the predetermined number of sheaves are stacked on the tray 700 in the state that the sheaves are alternately offset. Further, in each sheaf, the first-page sheet of which image-formed face was turned downward is at the lowermost position, and the subsequent sheets are stacked upward in the page order.

The control for each mode as above is performed by the finisher control unit 501. The unit 501 discriminates the mode set based on the instruction from the CPU circuit unit 205 in the image formation unit 100, and drives and controls each unit according to procedure determined for the set mode.

As described above, in the embodiment, the image formation apparatus 100 applies the conventional structure for carrying the sheet from the right and discharging it to the left, and the automatic original feed unit 101 applies the conventional structure for reversing the original mounted upward and also carrying it to the platen glass 102. Therefore, it is possible to provide an operation environment which is substantially identical with such a conventional operation environment as the user can set the original upward on the original mounting board by his right hand.

Further, in the embodiment, the original is fed and carried from its initial page in due order, and then subjected to the original running read. Then, the mirror process is performed to reverse the main-scan direction of the read image, and the image formation is performed. Therefore, in case of providing the image formation apparatus in which the printer and facsimile functions are composited to the copy function, since the image formation can be always performed from the initial page of the original or document, the common post-process (e.g., staple process) can be performed on the sheet in any function operation, whereby to make high the image reading speed and to copy the image identical with the original can be both achieved.

Furthermore, the sheet on which the image has been formed is turned downward and then its trailing edge is staple-processed. Therefore, since the left side of the sheet on which the image has been formed by the image formation apparatus can be staple-processed, the stapler can be mounted leftward in the image formation apparatus, whereby the finisher can be made compact in size.

As described above, according to the present invention, the image formation apparatus which has the satisfactory operability, the high operation speed, the various functions, the compact size, and the added values can be provided.

What is claimed is:

1. An image formation apparatus comprising:
   feed means for feeding an original set on an original tray through a read position;
   read means for reading an image of the original while the original passes through the read position in a sub-scan direction by said feed means, said read means being disposed in a main-scan direction;
   mirror image correction means for performing a mirror image correction by reversing the image read by said read means in the main-scan direction when said read means reads the image of the original while the original passes through the read position;
   image formation means for forming the image, to which the mirror image correction is performed by said mirror image correction means, on a sheet fed in the sub-scan direction, the image being formed in a same orientation as an image orientation of the original set on said original tray;
   sheet reverse means for reversing the sheet upside down on which the image has been formed by said image formation means;
   discharge means for discharging the sheet reversed by said sheet reverse means onto a stack means; and
   binding means for performing a binding process at a trailing edge of the sheet stacked on said stack means.

2. An apparatus according to claim 1, wherein said feed means feeds the original from said original tray on which a read face of the original to be read faces upward and a first page of the original is positioned uppermost.

3. An apparatus according to claim 2, wherein said feed means comprises:
   a feed path for reversing the original stacked on said original tray such that the read face of the original is opposite to an original mounting board, which includes the read position, and reversing a feed direction, to guide the original from said original tray to said original mounting board,
   wherein said feed means feeds the original stacked on said original tray to said feed path in a page order, and feeds the original, guided through said feed path, in the sub-scan direction toward the read position.

4. An apparatus according to claim 1, wherein said mirror image correction means comprises storage means for storing image data representing the image read by said read means in the main-scan direction, and reads the image data from said storage means in the main-scan direction in a reverse order to perform the mirror image correction.

5. An apparatus according to claim 1, wherein said feed means feeds the original from the left of said original tray, and reverses the original through a curved feed path, and feeds the original such that the original passes from left to right at the read position.

6. An apparatus according to claim 1, wherein said image formation means forms the image on the sheet fed from the right and then discharges the sheet to the left.

7. An image formation method comprising the steps of:
   feeding an original set on an original tray through a read position;
   reading an image of the original by an image scanner disposed in a main-scan direction while the original passes through the read position in a sub-scan direction;
   performing a mirror image correction by reversing the image read by the image scanner in the main-scan direction when the image of the original is read while the original passes through the read position;
   forming the image, to which the mirror image correction is performed, on a sheet fed in the sub-scan direction, the image being formed in a same orientation as an image orientation of the original set on the original tray;
   reversing the sheet upside down on which the image has been formed;
   discharging the sheet reversed onto a stack part; and
   performing a binding process at a trailing edge of the sheet stacked on the stack part.

8. A method according to claim 7, further comprising the step of reversing the original through a curved feed path, and feeding the original such that the original passes from left to right at the read position.

9. A method according to claim 7, further comprising the step of forming the image on the sheet fed from the right and then discharging the sheet to the left.

10. A method according to claim 7, further comprising the step of feeding the original from the original tray on which a read face of the original to be read faces upward and a first page of the original is positioned uppermost.

11. A method according to claim 10, further comprising the steps of:
    reversing the original stacked on the original tray such that the read face of the original is opposite to an original mounting board, which includes the read position;
    reversing a feed direction, to guide the original from the original tray to the original mounting board;
    feeding the original stacked on the original tray to a feed path in a page order; and
    feeding the original, guided through the feed path, in the sub-scan direction toward the read position.

12. A method according to claim 7, further comprising the steps of:
    storing image data representing the image read by the image scanner in the main-scan direction; and
    reading the image data in the main-scan direction in a reverse order to perform the mirror image correction.

13. An image formation apparatus comprising:
    a feeder for feeding an original set on an original tray through a read position;
    a reader for reading an image of the original while the original passes through the read position in a sub-scan direction by said feeder, said reader being disposed in a main-scan direction;
    a mirror image corrector for performing a mirror image correction by reversing the image read by said reader in the main-scan direction when said reader means reads the image of the original while the original passes through the read position;
    an image formation unit for forming the image, to which the mirror image correction is performed by said mirror image corrector, on a sheet fed in the sub-scan direction, the image being formed in a same orientation as an image orientation of the original set on said original tray;
    a sheet reverse unit for reversing the sheet upside down on which the image has been formed by said image formation unit; and
    a binder for performing a binding process at a trailing edge of the sheet reversed by said sheet reverse unit.

14. An apparatus according to claim 13, wherein said feeder feeds the original from the left of said original tray and reverses the original through a curved feed path, and feeds the original such that the original passes from left to right at the read position.

15. An apparatus according to claim 13, wherein said image formation unit forms the image on the sheet fed from the right and then discharges the sheet to the left.

16. An apparatus according to claim 13, wherein said feeder feeds the original from said original tray on which a read face of the original to be read faces upward and a first page of the original is positioned uppermost.

17. An apparatus according to claim 16, wherein said feeder comprises:

a feed path for reversing the original stacked on said original tray such that the read face of the original is opposite to an original mounting board, which includes the read position and reversing a feed direction, to guide the original from said original tray to said original mounting board, and wherein said feeder feeds the original stacked on said original tray to said feed path in a page order, and feeds the original, guided through said feed path, in the sub-scan direction toward the read position.

18. An apparatus according to claim 13, wherein said mirror image corrector comprises a memory for storing image data representing the image read by said reader in the main-scan direction, and reads the image data from said memory in the main-scan direction in a reverse order to perform the mirror image correction.

19. An apparatus according to claim 13, wherein said feeder feeds the original from a first side of said original tray and reverses the original through a curved feed path, and feeds the original such that the original passes from a first side to a second side at the read position.

20. An apparatus according to claim 13, wherein said image formation unit forms the image on the sheet fed from a second side and then discharges the sheet to a first side.

21. An image formation apparatus, which is attachable to a sheet processing apparatus including a sheet reverse unit for reversing the sheet upside down on which an image has been formed by an image formation unit, and a binder for performing a binding process formation unit, and a binder for performing a binding process to a trailing edge of the sheet reversed by said sheet reverse unit, said image formation apparatus comprising:

a feeder for feeding an original set on an original tray through a read position;

a reader for reading an image of the original while the original passes through the read position by said feeder;

a mirror image corrector for performing a mirror image correction when said reader reads the image of the original while the original passes through the read position; and an image formation unit for forming the image, to which the mirror image correction is performed by said mirror image corrector, on a sheet, the image being formed in a same orientation as an image orientation of the original set on said original tray without a mirror image being formed.

22. An apparatus according to claim 21, wherein said feeder feeds the original from the left of said original tray and reverses the original through a curved feed path, and feeds the original such that the original passes from left to right at the read position.

23. An apparatus according to claim 21, wherein said image formation unit discharges the sheet to the left.

24. An apparatus according to claim 23, wherein said image formation unit forms the image on the sheet fed from the right.

25. An apparatus according to claim 21, wherein said feeder feeds the original from the original tray on which a read face of the original to be read faces upward and a first page of the original is positioned uppermost.

* * * * *

UNITED STATES PATENT AND TRADEMARK OFFICE
CERTIFICATE OF CORRECTION

PATENT NO. : 6,574,011 B1 Page 1 of 1
DATED : June 3, 2003
INVENTOR(S) : Chikara Sato et al.

It is certified that error appears in the above-identified patent and that said Letters Patent is hereby corrected as shown below:

<u>Title page,</u>
Item [56], References Cited, U.S. PATENT DOCUMENTS, "Sato" should read
-- Sato, et al. --.
Item [57], ABSTRACT,
Line 1, "A" should read -- An --.

<u>Column 1,</u>
Line 54, "took" should read -- taken --; and
Line 65, "can not" should read -- cannot --.

<u>Column 2,</u>
Line 55, "stack" should read -- stacked --.

<u>Column 8,</u>
Line 15, "completes," should read -- is completed, --; and
Line 28, "timing" should read -- time --.

<u>Column 10,</u>
Line 9, "terminated" should read -- is terminated --; and
Line 34, "discharge" should read -- discharges --.

<u>Column 11,</u>
Lines 8 and 39, "took" should read -- taken --.

Signed and Sealed this

Second Day of December, 2003

JAMES E. ROGAN
*Director of the United States Patent and Trademark Office*